UNITED STATES PATENT OFFICE.

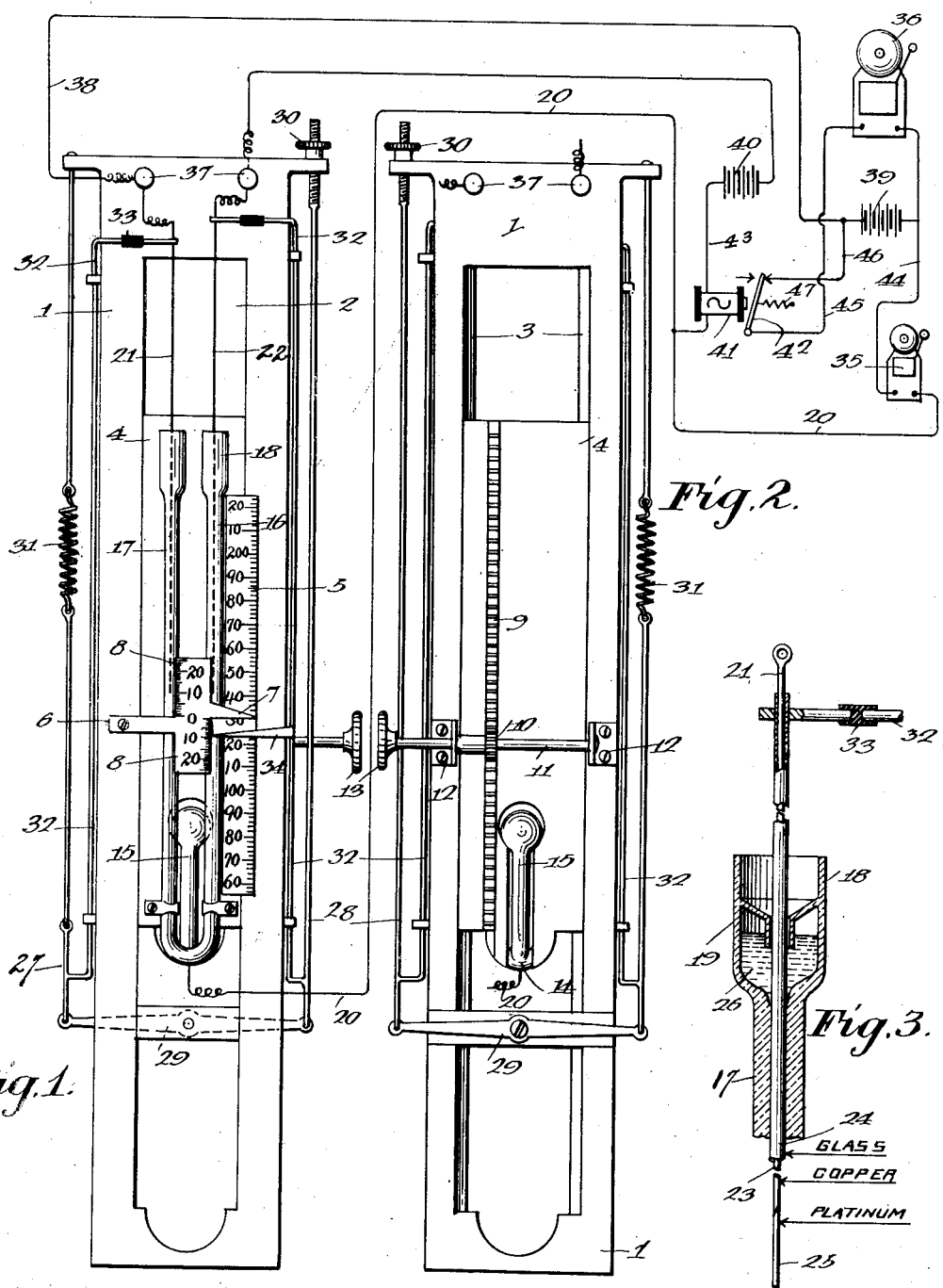

BENNETT W. JORDAN, OF MULLINS, SOUTH CAROLINA, ASSIGNOR OF ONE-HALF TO H. L. BUCK, OF HORRY COUNTY, SOUTH CAROLINA.

AUTOMATIC HEAT AND COLD REGULATOR ALARM.

1,312,123.  Specification of Letters Patent.  Patented Aug. 5, 1919.

Application filed December 22, 1914. Serial No. 878,624.

*To all whom it may concern:*

Be it known that I, BENNETT W. JORDAN, a citizen of the United States, residing at Mullins, in the county of Marion and State of South Carolina, have invented certain new and useful Improvements in Automatic Heat and Cold Regulator Alarms; and I do hereby declare the following to be a full, clear, and exact description of the invention, such as will enable others skilled in the art to which it appertains to make and use the same.

This invention pertains to a thermo-electric signal and may be associated with a suitable circuit arrangement designed to actuate a signal or a plurality of signals, when the position of a thermal element, forming a part of the device, varies beyond predetermined points.

The arrangement of the coöperating devices is such that the thermal element may be positioned at various points with relation to electrical terminals to actuate minimum and maximum thermo-electric alarms and thereby assist in governing the temperature at which the system, employing the invention as a part thereof, is to be operated.

Associated with the thermal element are suitable manually controlled devices for the arrangement of electrical terminals at various positions with relation to each other, each terminal controlling a separate circuit, whereby greater or lesser latitude may be provided between a maximum temperature and a minimum temperature for the operation of the system to which the invention is applied.

One embodiment of the invention is illustrated in the accompanying drawings, but it is to be understood that the construction therein shown is for the purposes of illustration only and not as defining the limits of the invention.

In the drawings:

Figure 1 is a front elevation of the circuit closer showing a circuit arrangement in which the device may be employed for certain purposes.

Fig. 2 is a rear elevation of the circuit closer.

Fig. 3 is an enlarged detail sectional view through the upper end of one of the tubular members and disclosing a form of one of the terminals.

While the invention is susceptible of a variety of uses, it will be described more particularly in connection with heating systems, as it is adapted for use in connection with incubators and tobacco curing systems.

In incubators, it is desirous that a substantially uniform temperature shall be employed, and the circuit closer is adapted to be placed in the electrical system which will warn the attendant through its thermal contacts, of changes in temperature above or below predetermined points.

In the curing of tobacco, substantially the same temperature requirements prevail as in incubators. For example, in certain stages in curing tobacco, the temperature should not appreciably vary for a given period. It may be stated that the temperature of a curing room should be maintained, for example, at 100° to 105° F. until the leaves of the tobacco plant assume a color which is desired, whereupon the temperature may be increased to retain or "set" the color and perfect the curing of the product. This increased temperature may even exceed 180° F. The curing of a plant may require from four to six days, and it is very desirable from a commercial standpoint, that the plant shall be properly cured and shall also present the proper color.

An object of the invention, therefore, is to assist the attendants who are employed to watch the curing operation in guarding against temperature changes beyond maximum or minimum points, by the employment of an electrical signal which may be controlled by an automatic circuit closer actuated by a thermal element.

Referring to the embodiment of the invention illustrated in the accompanying drawings, the circuit closer is shown mounted upon a base indicated at 1, which may be provided with a central aperture 2 having guiding flanges 3 for supporting a slidable base block 4. This base block is shown provided with a scale 5 in Fig. 1 which is movable therewith.

The base 1 is preferably provided with an indicator 6 having a hand 7 thereon which is adapted to coöperate with the scale 5 of the base block. The indicator 6 is secured to the base by any suitable means and is provided with extensions 8 having graduating scales thereon, the purpose of which will be hereinafter set forth. On the rear of the base block there is shown a rack 9 which is adapted to be engaged by a pinion 10 carried by a shaft 11, supported in journals 12 on the base. This shaft 11 may be rotated by any suitable means such as a thumb wheel 13.

The base block is provided with a thermometer or thermal element which is shown as comprising a plurality of tubular members which are united at the base 14 thereof. One of these tubular members 15 is preferably sealed, while the members 16 and 17 are arranged parallel to each other, and are provided at the upper ends with a substantially open cup-shaped terminal 18. The tubular members 16 and 17 may be of glass or other suitable transparent material, and the cup-shaped members 18 thereof may be provided with a flanged closure 19 as shown more clearly in Fig. 3. The tubular member 17 may be hereinafter designated as an open circuit tube, while the tubular member 16 may be designated as a closed circuit tube.

Any suitable thermal substance may be employed in the thermometer, such as mercury, which will serve as a conductor of electricity, or mercury may be employed with some other thermal substance or substances which is more sensitive to temperature changes than mercury, and this other substance may be positioned solely in the closed tube 15 thereby permitting the mercury to be positioned in tubes 16 and 17 and in the base 14 thereof, with which is connected an electrical terminal 20.

A movable electrical terminal 21 is positioned within the open circuit tube 17, and a similar movable electrical terminal 22 is positioned within the closed circuit tube 16. These terminals may be of any suitable material, but in a practical embodiment of the invention, they are disclosed as being composed of a copper wire indicated at 23 in Fig. 3, which may be covered by a glass tube 24 to insulate the same, and also fill up the channel in the open circuit tube 17. To the lower end of the copper wire there may be secured a bare platinum wire 25 which is designed to contact with the thermal conductor within the tube. Any suitable material, such as glycerin, or other suitable oils indicated at 26, may be placed within the cup 18 to seal the tubes 16 and 17 and prevent oxidization of the mercury.

Mounted on the base 1 is shown a plurality of terminal control rods 27, 28, which rods are connected with a pivoted lever 29 for simultaneous movement of the rods. The rod 28 is provided with any suitable means, such as the set screw 30 for moving the rods 27, 28 through the lever 29, while the rod 27 may be provided with a resilient element 31 to prevent accidental displacement of the rods and the electrical terminals which they control. Connected with the terminal rods 27, 28 are terminal supports 32, which may be provided with an insulated member 33, these supports 32 serving to connect with the terminals 21, 22 to position said terminals within the tubes 16 and 17. The terminal support 32 is shown provided also with an indicator hand 34 which coöperates with the scale upon the extension member 8 and also indicates the lowermost position of the electrical terminal 22.

The system in which the circuit closer is shown arranged, comprises a plurality of audible signals, one of which 35, may have a higher musical tone than the other, 36. Connecting with the terminal wire 21 is a conductor which leads to a binding post 37, from which the conductor 38 leads to a source of energy such as the battery 39. The terminal 22 passes through its binding post 37 and leads to a source of energy 40. The conductor 20 may extend from the base of the thermometer to the signal 35. A relay 41 having a pivoted armature 42, is shown interposed between the source of energy 40 and the conductor 20 by means of a conductor 43. The signal 35 is connected to the signal 36 by a conductor 44, and the armature 42 may be connected to the signal 36 by a conductor 45 and to the source of energy by a conductor 46.

When starting the system, the terminals 21, 22 are arranged at their zero position so that the lower ends thereof within the thermometer are directly opposite. The base block may then be adjusted upon the base to have the indicator hand 7 point to the temperature at which a system is to be operated, for example, in the drawings at 130°. If there is to be a 20° latitude for the temperature, the thumb screw 30 may be actuated until the pointer 34 is moved down to the 10° marked upon the fixed scale 8 of the indicator 6 on the base, which action also moves the terminal 22 in the closed circuit tube downwardly to the point of the indicator hand 34, and at the same time moves the terminal 21 upwardly so that it ends opposite to the point 10 on the fixed scale of the upper extension 8. In this arrangement the terminal 22 is in contact with the mercury conductor and forms a closed circuit through 22, 40, 41 and 20 which draws the armature 42 into contact with the relay. The terminal 21 is then out of contact with the mercury, and forms an open circuit. Should the temperature rise beyond 140, the mercury would contact with terminal 21 whereupon a circuit would be set up through 38, 39, 35 and 20 to sound the bell, indicating that the temperature was too high. Should the mercury drop below 120 in the closed circuit tube, it would break the contact between the mercury and terminal 22, whereupon the relay 41 would be deënergized, its armature moved by its resilient element 47 to its contact point and set up a separate circuit through the armature 42, the conductor 46, battery 39 and conductor 45, sounding the signal which indicates the temperature has become too low.

It will be observed that the circuit closer is automatic in its operation, and that it can be adjusted for various uses.

It is obvious that various changes in the form and proportion of parts may be made in the structure herein disclosed to adapt the device to various purposes, and the right is reserved to make such changes as fairly fall within the scope of the appended claims.

Having thus described my invention what I claim as new and desire to secure by Letters Patent is:

1. A circuit closer for a thermo-electric signal comprising a base, relatively movable electric terminals, said terminals mounted upon a pivoted bar, a thermometer containing a fluid designed to contact with the terminals at predetermined points, and means to move the pivoted bar to thereby simultaneously move the electric terminals to maximum and minimum contact points on the thermometer.

2. A circuit closer for a thermo-electric signal comprising a base, a bar pivotally mounted thereon, electric terminals carried thereby, a thermometer slidably mounted upon the base, said thermometer having tubes in alinement with the terminals of the bar, and containing a fluid designed to contact therewith at predetermined points, and an adjusting screw carried by the bar whereby said bar may be moved on its pivot to simultaneously move the terminals in opposite directions with respect to the fluid conductor of the thermometer.

3. A circuit closer comprising containers, a thermally sensitive fluid conductor therein, a pivoted bar, relatively movable electric terminals mounted thereon in alinement with the fluid conductor, and means to move the terminals in opposite directions with respect to the fluid to simultaneously position the terminals at maximum and minimum points of contact therewith.

4. A circuit closer comprising container members for a fluid conductor, electrical terminals adapted to contact with the fluid conductor, said terminals being capable of relative motion in parallel and opposite directions, and being connected with a pivoted element whereby said terminals may be simultaneously adjusted to various positions with relation to said fluid conductor.

5. A circuit closer comprising container members for a fluid conductor, relatively movable electrical terminals adapted to separately contact with the fluid conductor at different levels, said terminals being connected with a pivoted element whereby said terminals may be simultaneously moved in opposite directions to various positions with relation to said fluid conductor, said positions determining the maximum and minimum points of contact with the fluid, and means to retain said terminals in their adjusted positions.

6. A circuit closer comprising container members for a fluid conductor, relatively movable electrical terminals adapted to be positioned within said container members, and means to connect said terminals for simultaneous adjustment in opposite directions within said container members and operating to position the terminals at the maximum and minimum points of contact with the fluid.

7. A circuit closer comprising containers having a fluid conductor therein, relatively movable electrical terminals mounted in operative position with respect to the fluid conductor, and means to simultaneously adjust the individual terminals in opposite directions with respect to the fluid conductor.

8. A circuit closer comprising a base, containers for a fluid conductor mounted thereon, electrical terminals mounted in operative position with respect to the fluid, said terminals being capable of simultaneous adjustment relative thereto, and means to move the individual terminals in parallel and opposite directions.

9. A circuit closer comprising a base, tubular containers for a fluid conductor mounted thereon, electrical terminals mounted in operative position with respect thereto, means to move the individual terminals simultaneously in opposite directions to contact with the fluid at different levels, and means to retain the terminals in an adjusted position.

10. A circuit closer comprising a base having electrical terminals mounted thereon, means to connect said terminals for simultaneous movement in opposite directions, a receptacle for a fluid conductor including tubular containers adapted to receive and house a part of said terminals, and means whereby said fluid conductor receptacle may be moved to various positions on the base and with relation to said terminals.

11. A circuit closer comprising a base, an arm pivotally mounted thereon, electrical terminals mounted on said arm on opposite sides of the pivot point thereof, tubular containers movably mounted on the base, a fluid conductor contained therein, said terminals designed to contact with the fluid conductor, and means to move the arm to thereby simultaneously adjust the individual terminals in opposite parallel directions with respect to the conductor.

12. A circuit closer comprising containers for a fluid conductor, electrical terminals mounted in operative position with respect thereto, means to move the containers relative to the terminals, and means to simultaneously adjust the terminals relative to each other and in opposite directions with respect to the conductor.

13. A circuit closer comprising a base, relatively movable electrical terminals being carried by a pivoted arm and mounted on opposite sides of the fulcrum thereof, tubular containers slidably mounted on the base, a fluid conductor therein, means to move the containers to bring the conducting fluid in contact with the terminals, and means to adjust the individual terminals relative to each other to contact with the fluid at different levels.

In testimony whereof, I affix my signature, in presence of two witnesses.

BENNETT W. JORDAN.

Witnesses:
GEO. THOS. SWAIN,
D. L. GALLAGHER.